US007016660B2

(12) United States Patent
Meijer et al.

(10) Patent No.: US 7,016,660 B2
(45) Date of Patent: Mar. 21, 2006

(54) ANTENNA DIVERSITY RECEIVER

(75) Inventors: Pieter Meijer, Eindhoven (NL); Peter Wegner, Bockenem (NL)

(73) Assignee: Mannesman VDO AG, (DE)

( * ) Notice: Subject to any disclaimer, the term of this patent is extended or adjusted under 35 U.S.C. 154(b) by 767 days.

(21) Appl. No.: 09/939,373

(22) Filed: Aug. 24, 2001

(65) Prior Publication Data

US 2002/0025793 A1   Feb. 28, 2002

(30) Foreign Application Priority Data

Aug. 24, 2000   (EP) ................................. 00118353

(51) Int. Cl.
*H04B 1/06* (2006.01)
(52) U.S. Cl. .................... 455/277.2; 455/135
(58) Field of Classification Search ............. 455/277.1, 455/277.2, 272, 131
See application file for complete search history.

(56) References Cited

U.S. PATENT DOCUMENTS

| 4,499,606 | A | | 2/1985 | Rambo |
| 4,742,567 | A | * | 5/1988 | Ohe et al. ................ 455/277.2 |
| 5,826,179 | A | | 10/1998 | Lindenmeier et al. |
| 6,169,888 | B1 | * | 1/2001 | Lindenmeier et al. ... 455/277.2 |

FOREIGN PATENT DOCUMENTS

EP   0 247 157 A1   12/1987

OTHER PUBLICATIONS

Electronic Engineers' Handbook, by McGraw Hill Book, 1982, Section 16-4.*

* cited by examiner

*Primary Examiner*—Fan Tsang
*Assistant Examiner*—S. P. Sing
(74) *Attorney, Agent, or Firm*—Mayer, Brown, Rowe & Maw LLP

(57) ABSTRACT

An antenna diversity receiving system is disclosed which includes an antenna device with a plurality of FM antennas and a controllable switching circuit for sequentially switching through one of the plurality of FM antennas via an antenna cable to a receiver upon reception of a switching control signal. The receiver has a multipath detector coupled to a pulse generator for generating a pulse signal to be used as such switching control signal. To secure accurate detection of the switching control signal, the pulse generator is coupled to a pulse shaper to convert the pulse signal of the pulse generator into a pulse signal pair. The pulse signal pair has a first signal pulse followed by a second signal pulse having a signal polarity opposite to the signal polarity of the first signal pulse. The pulse signal pair has a waveform varying symmetrically around a reference level and is supplied through the antenna cable to the antenna device.

21 Claims, 2 Drawing Sheets

ANTENNA DIVERSITY RECEIVER

FIELD OF INVENTION

This invention relates to a switching system for improved FM reception. More specifically, a controller which selects an antenna from a plurality of antennas for superior FM reception is disclosed.

BACKGROUND OF INVENTION

Antenna diversity receiving systems having an antenna device including a plurality of FM antennas are known. These systems have a controlled switching circuit for sequentially switching through one of the plurality of FM antennas via an antenna cable to a receiver upon reception of a switching control signal. The receiver has a multipath detector coupled to a pulse generator for generating a pulse signal at the detection of multipath interference. Such a receiver is described in European Patent Application number 0 792 031 and is specifically suited to be used in vehicles.

The reception of a wanted RF broadcast transmitter signal may be disturbed or otherwise deteriorated by various phenomena, such as multipath reception and/or adjacent channel interferences. In general, multipath reception is caused by signal reflections at and/or against environmental physical obstacles, such as mountains, trees, buildings, fences and the like. Due to such signal reflections an RF broadcast signal may arrive at a certain reception location through different signal paths, i.e. in different amplitude and phase conditions. The summation of these multipath signals at the receiver antenna results in unpredictable signal amplitude and/or phase distortions, most often effectuating in part or complete cancellation of the useful RF reception signal. These signal cancellations, being referred to as signal dips, strongly depend on the RF carrier frequency of the received RF broadcasting signal and on the location of reception.

Signal dips severely deteriorate the desired RF broadcasting signal and also the overall signal reception quality. However, a relatively small shift in the position of the antenna receiving the desired RF broadcasting signal may already suffice to strongly improve signal reception quality. This solution is used in antenna diversity receiving systems of the above type to avoid reception of multipath distorted RF signals. In such antenna diversity receivers use is made of two or more antennas mutually spaced apart and coupled to an RF input of a receiver. Only the antenna having the best local receiving conditions with respect to the other antenna(s) is actually connected to the RF receiver input. This antenna, also referred to as the actual antenna, is effective in the reception and supply of the desired RF broadcasting signal through the antenna cable to the receiver as long as the multipath distortion at the actual antenna remains smaller than a certain predetermined multipath threshold level. As soon as the received multipath distortion exceeds the multipath threshold level, the RF signal supply to the receiver is changed from the actual antenna to another antenna positioned at a location with better receiving conditions. With proper control of the controller circuit, the receiver is continuously optimized for minimum multipath reception.

Present antenna diversity receiving systems have a multipath detector with an output coupled to a pulse generator for generating a pulse signal at the detection of multipath interference. This pulse initiates a proper switching operation resulting in a switch over of an RF broadcast signal from one antenna to a subsequent antenna. The pulse signal is supplied through the antenna cable to the controller to initiate the antenna switching operation. This switching operation is repeated if the RF broadcast signal received at the subsequent antenna also appears to be affected by multipath distortion exceeding the multipath threshold level, until an RF broadcast signal is actually received which is not affected by such multipath distortion.

The antenna cable carries RF broadcast signals (from the antenna device to the receiver) as well as pulse signals (in the opposite direction). These signals mutually interfere and in particular the pulse signals effect the useful FM RF broadcast signals and may become noticeable in the reproduced audio signals.

There is thus a need to simplify existing antenna diversity receiving systems allowing for a cost effective implementation thereof, while providing optimal signal reception. There is also a need for an antenna diversity receiving system using a single antenna cable for the transmission of both useful FM RF broadcast signals and pulsating switching control signals to secure an accurate detection of these pulsating switching control signals and to prevent the pulse signals from disturbing the processing of the useful FM RF broadcast signals in the receiver. There is a further need for a system to allow for the reception of various types of RF broadcast signals, in particular both AM and FM RF broadcast signals while preventing mutual interference between the various signals passing one and the same antenna cable, from occurring.

SUMMARY OF THE INVENTION

These needs may be addressed by the present invention which is may be embodied in an antenna diversity receiving system having an antenna device including a plurality of FM antennas as well as a controllable switching circuit for sequentially switching through one of the plurality of FM antennas via an antenna cable to a receiver upon reception of a switching control signal. The receiver has a multipath detector coupled to a pulse generator for generating a pulse signal at the detection of multipath interference. The receiver also has a pulse shaper circuit following the pulse generator to convert the pulse signal of the pulse generator into a pulse signal pair. The pulse signal pair has a first signal pulse followed by a second signal pulse with a signal polarity opposite to the signal polarity of the first signal pulse. The pulse signal pair has a waveform varying symmetrically around a reference level and which is supplied through the antenna cable to the antenna device.

By applying the above components, the pulse signals passing through the antenna cable have no DC signal energy, thereby preventing any DC level variation, including DC variations of a detection threshold level. This stabilizes the detection accuracy of the pulse signals. Furthermore, the spectral distribution of signal energy of the pulse signals prevents the pulse signals from becoming noticeable in the reproduced audio signals.

To simplify implementation of the pulse shaper, the pulse signal waveform of the pulse generator is substantially rectangular, varying during a first signal transient from a first signal level to a second signal level and during a second signal transient from said second signal level to the first signal level. The pulse shaper circuit has a signal differentiator for differentiating the pulse signal of the pulse generator to form first and second pulse spikes which have mutually opposite signal polarity. The spikes occur substantially during the first and second signal transients. The signal differentiator has a first inductance element coupled between an output resistance of the pulse generator and a DC supply voltage.

Another embodiment of the antenna diversity receiving system according to the invention is characterized by the pulse shaper circuit being coupled to the antenna cable through a first FM blocking filter which provides signal suppression within the frequency range of the FM RF broadcast frequency band. This reduces pulse signal energy within the useful FM RF broadcast frequency band at the antenna cable, and smooths the form of the pulse signal pair into a roughly, sinusoidal waveform. A cost effective implementation of the first FM blocking filter includes a first parallel LC circuit having a resonance frequency substantially corresponding to the center frequency within the frequency range of the FM RF broadcast frequency band.

Another embodiment of an antenna diversity receiving system according to the invention, providing effective detection of pulse signal pairs, includes an antenna device which has a control signal detector. The detector has an input coupled to the antenna cable for supplying pulse signal pairs from the pulse shaper circuit. The detector has an output coupled to a control input of the controllable switching circuit. The control signal detector has a threshold circuit which provides a threshold level and generates a switching control signal pulse for the controllable switching circuit when the pulse signal pair at the input of the control signal detector exceeds the threshold level. The antenna device has a counting device coupled between the control signal detector and the control input of the controllable switching circuit to simplify accurate antenna switching in consecutive order. The coutngin device counts the switching control signal pulses in a cycle which have a number of values corresponding to the number of fixed antennas of the antenna device.

A second FM blocking filter is provided to prevent signal leakage within the frequency range of the FM RF broadcast frequency band via the control signal path of the antenna device. The second FM filter affects signal suppression within the frequency range of the FM RF broadcast frequency band. Preferably, the second FM blocking filter has a second parallel LC circuit having a resonance frequency substantially corresponding to the center frequency within the frequency range of the FM RF broadcast frequency band.

A further preferred embodiment of an antenna diversity receiving system according to the invention, includes an antenna device having a second inductance element DC coupled through the antenna cable in parallel to the first inductance element. The second inductance element is coupled between an input of the control signal detector and a reference voltage. The first and second inductance elements form part of the differentiator of the pulse shaper circuit and are given inductance values with regard to the output resistance of the pulse generator to properly differentiate the pulse signal of the pulse generator.

Another embodiment of an antenna diversity receiving system according to the invention includes an AM antenna coupled via an AM amplifying circuit to the antenna cable. The system includes an AM signal compensation circuit which compensates AM signals occurring at a first input of the AM signal compensation circuit by AM signals occurring at a second input thereof. The first and second inputs are coupled to the antenna cable and an output of the amplifying circuit respectively. An output of the AM signal compensation circuit is coupled to the controllable switching circuit. This measure allows for the reception of RF AM broadcast signals, while preventing amplitude variations due to the RF AM broadcast signals from being detected as switching control signals. False antenna switching operations are thus effectively avoided. Preferably, the output of the AM signal compensation circuit is coupled through the control signal detector to the controllable switching circuit.

The AM amplifying circuit is coupled through an inverter stage to the second input of the AM signal compensation circuit to increase the accuracy in compensation. The AM signal compensation circuit has an adder circuit for addition of the signals at the first and second inputs of the AM signal compensation circuit. Alternatively, the AM amplifying circuit may have a balanced AM amplifier with non-inverting and inverting output stages of a balanced AM amplifier coupled to the first and the second input of the AM signal compensation circuit respectively.

The accuracy of compensation may be further increased by a first high pass filter coupled between the output of the first AM signal amplifier and the antenna cable and a second high pass filter coupled between the output of the second AM signal amplifier and the second input of the AM signal compensation circuit for a high pass selection of the AM RF frequency band.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

DESCRIPTION OF THE PREFERRED EMBODIMENT

Figure 1:
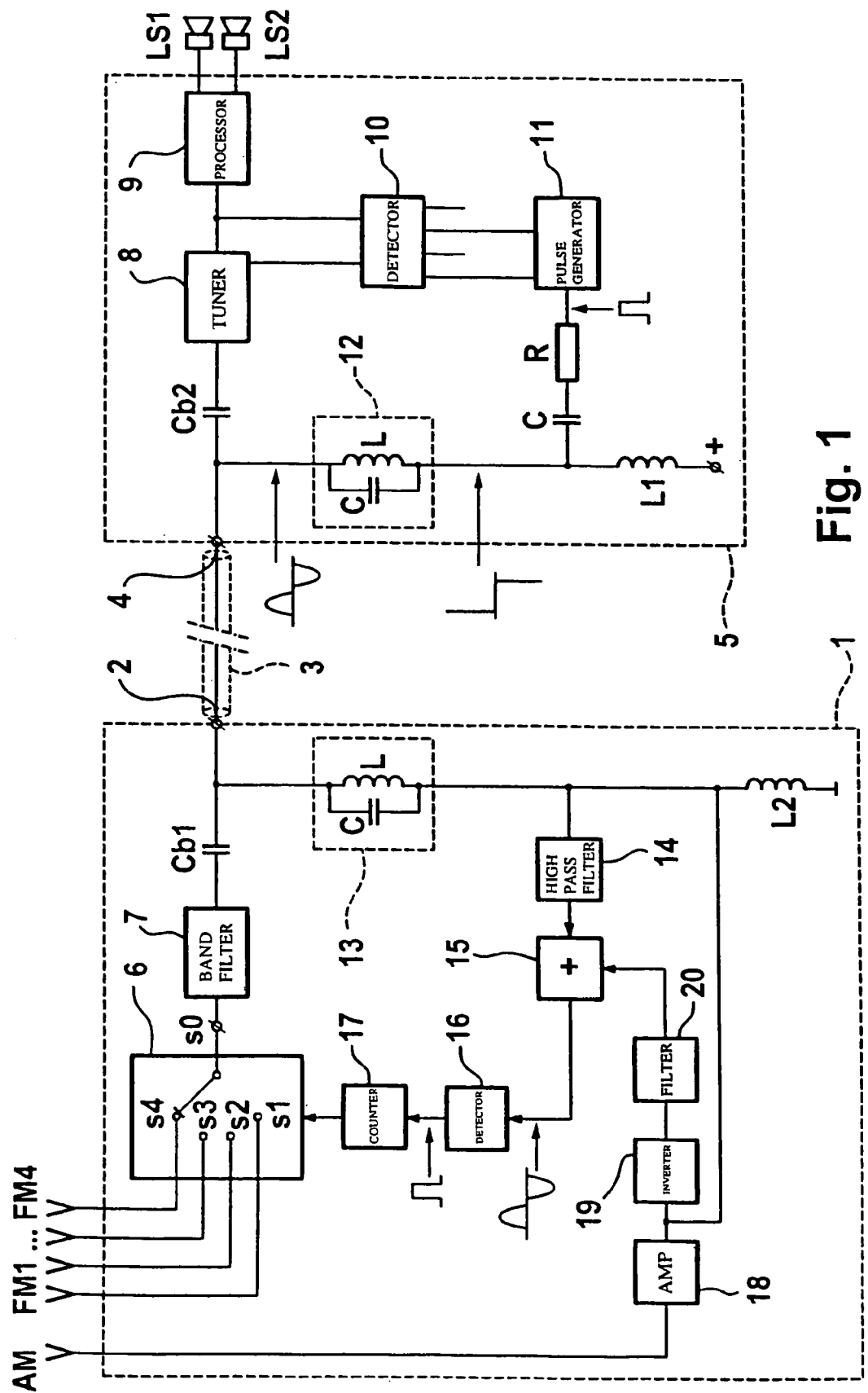
FIG. 1 is a block diagram of an antenna diversity receiving system according to the invention comprising an antenna device coupled via an antenna cable to a receiver.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

FIG. 1 shows an embodiment of an antenna diversity receiving system according to the present invention for use in cars. The system has an antenna diversity box 1, inputs connected to an antenna system having a single AM antenna (AM) and FM antennas (FM1–FM4). In contrast with the antennas used in the above mentioned known systems, the AM and FM antennas (AM and FM1–FM4), each have a fixed predetermined aerial characteristic. In a practical embodiment, the fixed predetermined aerial characteristics of the FM antennas FM1–FM4 are chosen to mutually differ such that they each provide a maximum aerial gain factor in mutually different directions. Preferably, the mutually differing angles of maximum aerial gain are chosen to cover the full angular area, in which proper reception of an RF FM broadcast signal is most likely to occur.

An output of the antenna diversity box 1 is coupled via a first antenna cable terminal 2, an antenna cable 3 and a second antenna cable terminal 4 to a receiver 5. When used in a car, the antenna diversity box 1 is mounted close to the antenna system, e.g. an antenna structure integrated in the rear window of a car. The combination of the antenna diversity box 1 and the antenna system may be referred to as an "antenna device." The receiver 5 may be mounted elsewhere in the car, e.g. in a front dashboard panel. The antenna diversity box 1 includes a controllable switching circuit 6 having antenna terminals s1–s4. The antenna terminals s1–s4 are coupled to FM antennas FM1–FM4 respectively and a switching circuit to connect one of the FM antennas FM1–FM4, such as the FM antenna FM4, to a switch output terminal s0. Upon receiving a switching control signal at a switching control input ci of the controllable switching circuit 6, an FM antenna is disconnected from the switch output terminal s0, after which another FM antenna, for example the FM antenna following in subsequent order after the first FM antenna, such as FM antenna FM1, is switched to be connected to the switch output terminal s0. The selected FM antenna supplying a broadband RF FM broadcast signal to the switch output terminal s0 is referred to as the actual FM antenna. The actual FM antenna is in a position which is somewhat shifted with regard to the previous actual FM antenna, and also differs in its antenna gain characteristic. This may improve the signal quality of the broadband RF FM broadcast signal at the switch output terminal s0. The switch output terminal s0 is coupled to a broadband RF FM band filter 7 providing broadband selection and/or amplification of the received broadband RF FM signal. The signal is transmitted through a DC blocking capacitor Cb1 and the antenna cable terminal 6 to the antenna cable 3. A coaxial type cable is used for the antenna cable 3 in this example. The AM antenna, AM, is coupled via the antenna diversity box 1 to the first antenna cable terminal 2, as will be explained in more detail below.

The second antenna cable terminal 4 is an RF input for the receiver 5 and is followed via a DC blocking capacitor Cb2 by an AM/FM tuner 8. The broadband RF AM and FM signals passing the antenna cable 6 arrive at the AM/FM tuner 8, which selects and demodulates a desired AM RF signal into a baseband AM modulation signal and a desired FM RF signal into an FM IF signal followed by demodulating the FM IF signal into an FM stereomultiplex signal. The output signal of the AM/FM tuner 8 which is either the baseband AM modulation signal or the FM stereomultiplex signal, is supplied to a signal processor 9. The signal processor 9 processes these signals into a baseband audiosignal and into left and right baseband stereo signals. Reproduction of these signals takes place in first and second loudspeakers LS1 and LS2.

Figure 3:
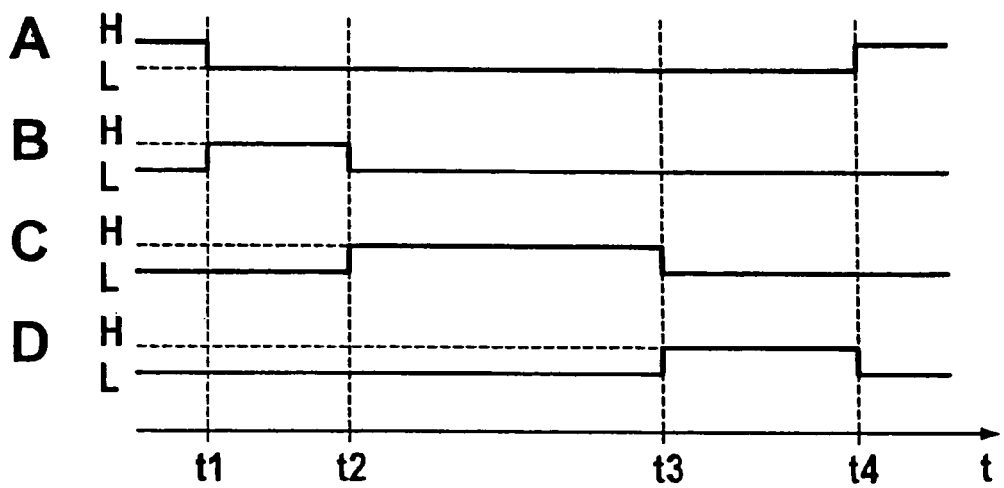
FIG. 3 is a series of time plots of the output signals of the multipath detector of FIG. 1.
Figure 4:
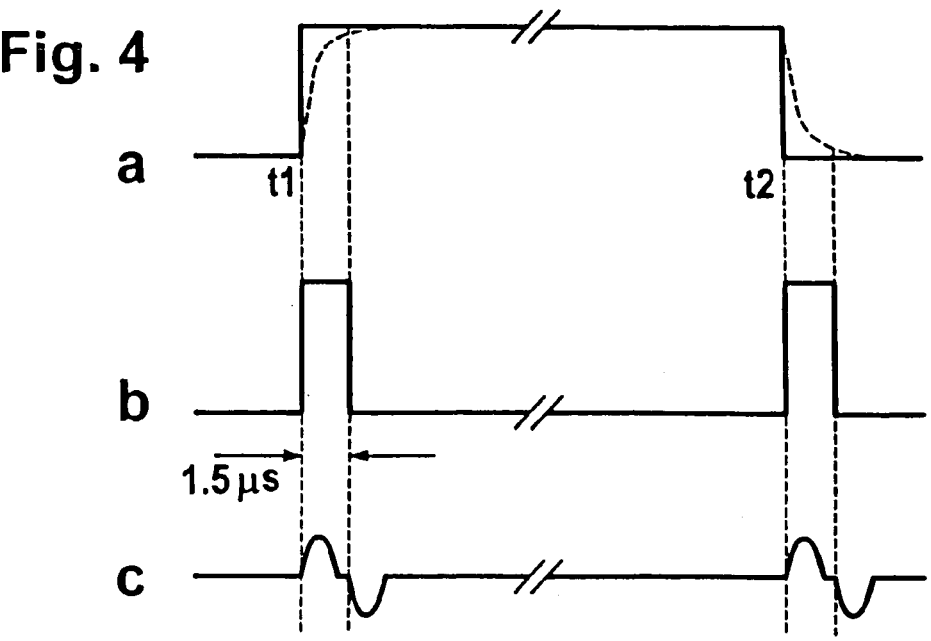
FIG. 4 is a series of time plots of output signals of the multipath detector, the pulse generator and a pulse shaper following the pulse generator of FIG. 1.

The receiver 5 also includes a multipath detector 10 coupled to the AM/FM tuner 8. The multipath detector 10 receives a signal from the AMLFM tuner indicative of the FM IF signal level, referred to as the IF level signal, as well as the FM stereomultiplex signal which is the tuner output signal. In this example, the multipath detector 10 is implemented with an type TEA 6101 integrated circuit, which is connected to a pulse generator 11. The occurrence of an amplitude dip in the FM IF signal coinciding with distortion in a frequency range of the tuner output signal above the frequency range of the FM stereomultiplex signal, is indicative of multipath distortion. When multipath distortion is detected, the multipath detector 10 triggers the pulse generator 11 to generate a pulse signal of a standard rectangular waveform. This waveform varies during a first signal transient from a first signal level to a second signal level and during a second signal transient from the second signal level to the first signal level. The operation and function of the multipath detector 10 and the pulse generator 11 will be described in more detail below with reference to FIGS. 3 and 4.

The pulse generator 11 has an output which is coupled to a pulse shaper which includes a signal differentiating circuit RLC for differentiating the standard rectangular pulse signal waveform of the pulse generator 11. The signal differentiating circuit RLC converts the rectangular pulse signal waveform into a pulse signal pair having a first signal pulse, or a first pulse spike, followed by a second signal pulse, or a second pulse spike, having a signal polarity opposite to the signal polarity of the first signal pulse. The spike pulses occur substantially during the first and second signal transients. The overall waveform of the pulse signal pair varies symmetrically around a reference level.

The pulse shaper is coupled to a first FM blocking filter 12 providing for signal suppression within the frequency range of the FM RF broadcast frequency band. The first FM blocking filter 12 has a first parallel LC circuit having a resonance frequency substantially corresponding to the center frequency within the frequency range of the FM RF broadcast frequency band. The first FM blocking filter 12 strongly reduces the occurrence of pulse signal energy within the useful FM RF broadcast frequency band at the antenna cable, and smooths the form of the pulse signal pair. The pulse signals from the second antenna cable terminal 4, i.e. at the RF input of the receiver 5, are therefore prevented from becoming noticeable in the reproduced audio signals. Furthermore, the pulse signals passing from the antenna cable 3 to the antenna diversity box 1, have no DC signal energy, thereby preventing any DC level variation, including DC variations at a detection threshold level. The mutually opposite polarities of the first and second signal pulses prevent any parasitic DC level integration at the p-n diode junctions of the transistors used in the circuitry of the antenna device. This stabilizes the accuracy in the detection of the pulse signals.

A bias voltage is supplied through a first inductor L1 and an inductor of the first FM blocking filter 12 to the second antenna cable terminal 4. The first antenna cable terminal 2 in the antenna diversity box 1 is DC coupled through an inductor of a second FM blocking filter 13 to a second inductor, L2. The bias voltage is used to bias both the antenna diversity box 1 and the receiver 5.

The signal differentiating circuit RLC includes a resistor R coupling the output of the pulse generator 11 via a capacitor C to the common connection between the first inductor L1 and the first FM blocking filter 12. The first inductor L1 is connected in parallel to the second inductor L2 via the inductor of the first FM blocking filter 12, the antenna cable 3, and the inductor of the second FM blocking filter 13. The standard rectangular pulse signal waveform of the pulse generator 11 is differentiated by the first and second inductors L1 and L2, the resistor R and the capacitor C. The resistor R may be formed by the output resistance of the pulse generator 11 itself. The values of the various elements (R, C, L1 and L2) are chosen to properly obtain the above mentioned pulse signal pair from the standard rectangular pulse signal waveform of the pulse generator 11.

The second FM blocking filter 13 prevents leakage of signals at the first antenna cable terminal 2 within the frequency range of the FM RF broadcast frequency band via a control signal path of the antenna device. For this purpose, the second FM blocking filter 13 is designed to effect signal suppression within the frequency range Of the FM RF broadcast frequency band. Preferably, the second FM blocking filter 13 has a second parallel LC circuit having a resonance frequency substantially corresponding to the center frequency within the frequency range of the FM RF broadcast frequency band.

An output of the second FM blocking filter 13 is coupled via the first high pass filter circuit 14 and an AM signal compensation circuit 15 to a control signal detector 16 to detect the occurrence of a pulse signal pair. The control signal detector 16 has a threshold circuit providing a threshold level for effective detection of the pulse signal pairs. The control signal detector 16 generates a switching control signal pulse when the pulse signal pair occurring at the input of the control signal detector 16 exceeds the threshold level. These switching control signal pulses are indicative for the occurrence of a multipath distortion in the received RF FM signal.

The antenna device preferably has a counting device 17 coupled between the control signal detector 16 and the control input ci of said controllable switching circuit 6 to simplify accurate antenna switching in a predetermined sequential order. The output value of the counting device 17 varies monotonously with each switching control signal pulse of the control signal detector 16 within a counting cycle. The number of values within one cycle corresponds to the number of fixed antennas FM1–FM4 of the antenna device. The use of the counting device 17 introduces a degree of freedom in the choice of an eventual counting cycle of the pulse generator 11. The counting device 17 is preferably a Johnson type counter.

The AM antenna AM is coupled via an AM amplifier 18 and the common connection between the second indcutor L2 and the second FM blocking filter 13 to the antenna cable 3. The second FM blocking filter 13 strongly reduces any distortion or other unwanted signals received by the AM antenna AM and occurring within the FM RF frequency range from appearing via the antenna cable 3 at the RF input of the AM/FM tuner 8.

The RF AM broadcast signals arriving at the first antenna cable terminal 2 may strongly vary and such amplitude variations may be mistaken for multipath indicative pulse signal pairs. To prevent such amplitude variations from initiating false antenna switching operations, the output signals of the AM amplifier 18 are connected to the second inductor L2 and the second FM blocking filter 13 via the first high pass band filter 14 to a first input of the AM signal compensation circuit 15. The output signals of the AM amplifier 18 are also connected to via an inverter 19 which inverts the polarity of the output signals of the AM amplifier 18 and a second high pass band filter 20 to a second input of the AM signal compensation circuit 15. The cut off frequency of the first and second high pass band filters 14 and 20 are chosen to correspond to the lower limit frequency of the AM RF broadcast frequency band, i.e. 144 Khz. The first and second high pass band filters 14 and 20 select the broadband RF AM broadcast signals and do not hinder passage of pulse signal pairs from the output of the second FM blocking filter 13 to the AM signal compensation circuit 15. The AM signal compensation circuit 15 provides for a cancellation of broadband AM RF signals supplied to its first and second inputs and may be constituted by an adder or a subtractor. In the embodiment shown signal polarity inversion performed by the inverter 19, allowing the use of an adder for the AM signal compensation circuit 15. Such signal polarity inversion may alternatively be obtained by using a balanced AM amplifier having non-inverting and inverting output stages (not shown). Another alternative is to use a subtractor for the AM signal compensation circuit 15 which removes the necessity for prior signal polarity inversion. The compensation of AM RF broadcast signals in the input signal path of the control signal detector 16 allows for a continuous reception of RF AM broadcast signals at the RF input of the AM/FM tuner 8, while preventing amplitude variations due to such RF AM broadcast signals being detected as switching control signals. False antenna switching operations are therefore effectively avoided.

The positioning of the first high pass filter 14 in the signal path between the second FM blocking filter 13 and the AM signal compensation circuit 15 allows for a simple DC bias provision for the AM amplifier 18.

Figure 2:
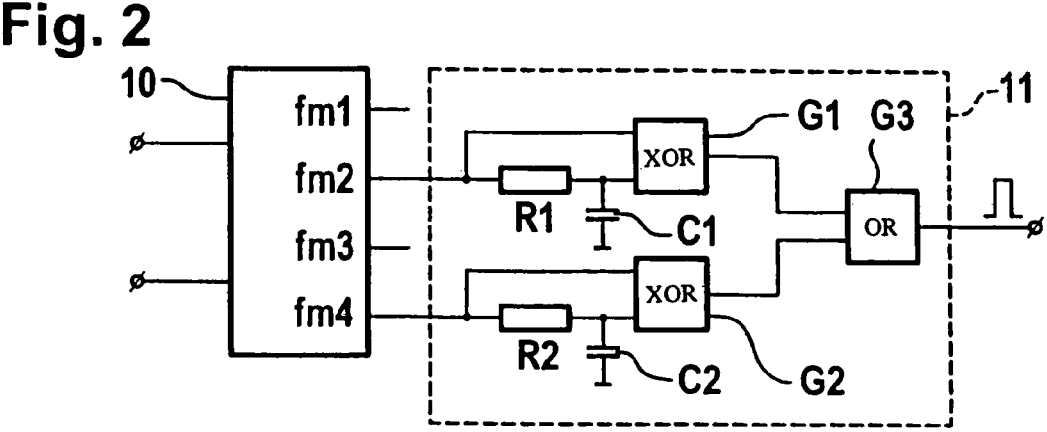
FIG. 2 is a block diagram of a multipath detector and a pulse generator for use in the antenna diversity receiving system of FIG. 1.

FIG. 2 shows a preferred implementation of a multipath detector 10 using a Philips' TEA6101 integrated circuit and the pulse generator 11 for use in the antenna diversity receiving system of FIG. 1. The TEA6101 integrated circuit has 4 pin connectors fm1, fm2, fm3, and fm4. An example of the binary signals occurring at these pin connectors fm1, fm2, fm3, fm4 upon detection of multipath distortion exceeding a certain predetermined multipath threshold level occurring at sequential points in time t1–t4 are shown in signal plots A, B, C and D respectively of FIG. 3. At any point in time, only one of the binary signals has a high output voltage or digital "1" value. During a high output voltage or digital "1" value, the corresponding antenna FM1, FM2, FM3 or FM4 is switched via the antenna cable 3 to the RF receiver input 4. Further detailed reference of the TEA6101 integrated circuit may be found in the Philips IC Data Handbook which is hereby incorporated by reference.

The pin connectors fm2 and fm4 are coupled to exclusive OR gates G1 and G2 of the pulse generator 11 directly and through delay elements R1C1 and R2C2, respectively. Outputs of the exclusive OR gates G1 and G2 are coupled to inputs of a non-exclusive OR gate G3, which is connected to the pulse shaper having the differentiator circuit RLC (the inductor L being formed by the first and second inductors L1 and L2 in parallel). The delay elements R1C1 and R2C2 each are part of an RC circuit which delays the digital signal value supplied at the pin connectors fm2 and fm4 over an RC time constant to one of the inputs of the respective exclusive OR gates G1 and G2. A high or digital "1" value arising at for example pin connector fm2 upon detection of a multipath distortion on a point in time t1, will immediately be supplied to the one input of the exclusive OR gate G1 and some time later at the other input of said exclusive OR gate G1. This results in a pulse shaped signal having a rectangular waveform at the output of said exclusive OR gate G1, the pulsewidth thereof being determined by the RC time constant of the delay element R1C1. This is further illustrated in FIG. 4, in which signal plots a-c, are shown based on the signal plot B of FIG. 3. The signal plot B in this example is the binary signal occurring at the pin connector fm2 of the multipath detector 10. The RC time constant chosen effectuates a pulsewidth of 1.5 us. as shown in signal plot b of FIG. 4. As explained above, this pulse signal is differentiated by differentiator circuit RLC which is coupled at the output of the pulse generator 11 resulting in a pulse signal pair having first and second spike pulses of mutually opposite polarity. The spikes formed by pulse signal pair is smoothed by the first FM blocking filter 12 into pulse signal pairs as shown in signal plot c of FIG. 4.

It will be apparent to those skilled in the art that various modifications and variations can be made in the method and system of the present invention without departing from the spirit or scope of the invention. For example, the functions of the multipath detector 10 and the pulse generator 11 may be achieved with any multipath detector generating a pulse of standard rectangular waveform, each time the actually received multipath distortion increases above and/or decreases below a predetermined multipath threshold level. The counting device 6 may have a counting cycle different from the number of pin connectors of the IC TEA 6101. The pulse width may differ from the above chosen value of 1.5 us. The differentiating circuit may be implemented with an alternative frequency dependent circuit and/or by using a single inductance, and with a proper DC bias circuit for the AM amplifying means 18. The first high pass filter 14 may alternatively be included in the signal path between the AM amplifying means 18 and the second FM blocking filter 13. The present invention is not limited by the foregoing descriptions but is intended to cover all modifications and variations that come within the scope of the spirit of the invention and the claims that follow.

What is claimed is:

1. An antenna diversity receiving system comprising:
    a receiver having a multipath detector coupled to a pulse generator for generating a pulse signal at the detection of multipath interference;
    an antenna device including a plurality of FM antennas and a controllable switching circuit for sequentially switching through one of said plurality of FM antennas via an antenna cable to the receiver upon reception of a switching control signal; and
    wherein the receiver includes a pulse shaper coupled to the pulse generator to convert the pulse signal of the pulse generator into a pulse signal pair having a first signal pulse followed by a second signal pulse having a signal polarity opposite to the signal polarity of the first signal pulse, the pulse signal pair having a waveform varying symmetrically around a reference level, the pulse signal pair having no DC signal energy and being supplied through the antenna cable to the antenna device; and wherein the controllable switching circuit determines the reception of the switching control signal by detecting the occurrence of the pulse signal pair.

2. The antenna diversity receiving system according to claim 1, wherein the pulse signal of the pulse generator has a standard, substantially rectangular waveform, which varies during a first signal transient from a first signal level to a second signal level and during a second signal transient from the second signal level to the first signal level, and
    wherein the pulse shaper further includes a signal differentiating circuit for differentiating the pulse signal of the pulse generator to form first and second pulse spikes having mutually opposite signal polarity occurring substantially during said first and second signal transients.

3. An antenna diversity receiving system according to claim 2 wherein the signal differentiating circuit includes a first inductor coupled between an output resistance of the pulse generator and a reference voltage.

4. An antenna diversity receiving system according to claim 1 wherein the pulse shaper is coupled to the antenna cable through a first FM blocking filter which suppresses signals within the frequency range of the FM RF broadcast frequency band.

5. An antenna diversity receiving system according to claim 4 wherein the first FM blocking filter has a first parallel LC circuit having a resonance frequency substantially corresponding to the center frequency within the frequency range of the FM RF broadcast frequency band.

6. An antenna diversity receiving system according claim 2 wherein the antenna device has a control signal detector having an input and an output, wherein the input is coupled to the antenna cable and supplies pulse signal pairs from the pulse shaper and the output is coupled to a control input of the controllable switching circuit, the control signal detector further including a threshold circuit providing a threshold level and generating a switching control signal pulse for the controllable switching circuit when the pulse signal pair occurring at the input of the control signal detector exceeds the threshold level.

7. An antenna diversity receiving system according to claim 6, wherein the antenna device includes a counting device coupled between the control signal detector and the control input of the controllable switching circuit having a counting cycle of counting values corresponding to the number of fixed antennas of the antenna device.

8. An antenna diversity receiving system according to claim 6 wherein the antenna device includes a second FM blocking filter which suppresses signals within the frequency range of the FM RF broadcast frequency band.

9. An antenna diversity receiving system according to claim 8 wherein the second FM blocking filter includes a second parallel LC circuit having a resonance frequency substantially corresponding to the center frequency within the frequency range of the FM RF broadcast frequency band.

10. An antenna diversity receiving system according to claim 3 wherein the antenna device includes a second inductor DC coupled through the antenna cable in parallel to the first inductor, the second inductor being coupled between an input of the control signal detector and a bias reference voltage.

11. An antenna diversity receiving system comprising:
    a receiver having a multipath detector coupled to a pulse generator for generating a pulse signal at the detection of multipath interference;
    an antenna device including a plurality of FM antennas and a controllable switching circuit for sequentially switching through one of said plurality of FM antennas via an antenna cable to the receiver upon reception of a switching control signal;
    wherein the receiver includes a pulse shaper coupled to the pulse generator to convert the pulse signal of the pulse generator into a pulse signal pair having a first signal pulse followed by a second signal pulse having a signal polarity opposite to the signal polarity of the first signal pulse, the pulse signal pair having a waveform varying symmetrically around a reference level and being supplied through the antenna cable to the antenna device;
    an AM antenna coupled via the antenna cable to the receiver; and
    an AM signal compensation circuit which having a first and second input and an output, the first input coupled to the antenna cable and the second input coupled to the AM antenna, the circuit compensating the AM signals occurring at the first input by the AM signals occurring at the second input thereof, said first and second input being respectively coupled to the antenna cable and the AM antenna, and the output coupled to the controllable switching circuit.

12. An antenna diversity receiving system according to claim 11, wherein that the output of the AM signal compensation circuit is coupled through the control signal detector to the controllable switching circuit.

13. An antenna diversity receiving system according to claim 11 further comprising an AM amplifier is coupled through an inverter stage to the second input of the AM signal compensation circuit and the AM signal compensation circuit includes an adder circuit which adds the signals at the first and second inputs.

14. An antenna diversity receiving system according to claim 13 wherein the AM amplifier has a balanced amplifier having non-inverting and inverting output stages.

15. An antenna diversity receiving system according to claim 13 further comprising:
   a first high pass filter coupled between the AM signal amplifier and the first input of the AM signal compensation circuit; and
   a second high pass filter coupled between the AM signal amplifier and the second input of the AM signal compensation circuit.

16. An antenna diversity receiving system according to claim 15 wherein the antenna device includes a second FM blocking filter which suppresses signals within the frequency range of the FM RF broadcast frequency band and a second inductor coupled to the antenna, wherein that the first high pass filter is coupled between the common connection of the second FM blocking filter and the second inductor.

17. Antenna diversity receiving system according to claim 11 wherein each AM and FM antenna have a fixed predetermined aerial characteristic.

18. An antenna diversity receiving system according to claim 17 wherein the fixed predetermined aerial characteristics of the FM antennas are chosen to provide a maximum aerial gain factor in mutually different directions.

19. An antenna diversity receiving system according to claim 18, wherein the mutually differing directions of maximum aerial gain are chosen to cover an angular area, in which proper reception of an RF FM broadcast signal is most likely to occur.

20. An antenna diversity receiving system according to claim 1 which is part of a receiver.

21. An antenna diversity receiving system according claim 1 which is part of an antenna device.

* * * * *